(12) United States Patent
Priese et al.

(10) Patent No.: US 12,157,694 B2
(45) Date of Patent: Dec. 3, 2024

(54) METHOD OF PRODUCING AN OPTICAL ELEMENT FROM GLASS

(71) Applicant: DOCTER OPTICS SE, Neustadt an der Orla (DE)

(72) Inventors: Christoph Priese, Bad Klosterlausnitz (DE); Alexander Kuppe, Kamsdorf (DE); Thomas Lehmann, Jena (DE)

(73) Assignee: DOCTER OPTICS SE, Neustadt an der Orla (DE)

( * ) Notice: Subject to any disclaimer, the term of this patent is extended or adjusted under 35 U.S.C. 154(b) by 118 days.

(21) Appl. No.: 16/650,646

(22) PCT Filed: Sep. 22, 2018

(86) PCT No.: PCT/DE2018/000272
§ 371 (c)(1),
(2) Date: Mar. 25, 2020

(87) PCT Pub. No.: WO2019/072325
PCT Pub. Date: Apr. 18, 2019

(65) Prior Publication Data
US 2020/0247708 A1 Aug. 6, 2020

(30) Foreign Application Priority Data
Oct. 10, 2017 (DE) .......................... 102017009440.3

(51) Int. Cl.
*C03B 35/00* (2006.01)
*C03B 11/08* (2006.01)
*C03B 27/00* (2006.01)

(52) U.S. Cl.
CPC ............ *C03B 35/005* (2013.01); *C03B 11/08* (2013.01); *C03B 27/00* (2013.01); *C03B 2215/49* (2013.01); *C03B 2225/02* (2013.01)

(58) Field of Classification Search
None
See application file for complete search history.

(56) References Cited

U.S. PATENT DOCUMENTS 4,891,053 A * 1/1990 Bartman ................. C03B 11/08
264/1.21
5,762,673 A 6/1998 Hirota
(Continued)

FOREIGN PATENT DOCUMENTS

| DE | 19633164 A1 | 2/1998 |
| DE | 10100515 A1 | 7/2002 |

(Continued)

OTHER PUBLICATIONS

JP 62191430 machine translation, Kogure et al., Material to be pressed for optics and conveyor for pressed lenses, Aug. 1987 (Year: 1987).*

(Continued)

*Primary Examiner* — Queenie S Dehghan
(74) *Attorney, Agent, or Firm* — Barnes & Thornburg LLP

(57) ABSTRACT

The invention relates to a method for producing an optical element from glass, wherein a portion of glass or a glass blank is blank-pressed, in particular on both sides, to form the optical element, wherein the optical element is then placed on a transport element and passes through a cooling path with the transport element, without the optical surface of the optical element being touched.

22 Claims, 10 Drawing Sheets

(56) References Cited

U.S. PATENT DOCUMENTS

| | | | |
|---|---|---|---|
| 6,295,172 B1* | 9/2001 | Yamamichi | C03B 11/08 65/37 |
| 6,574,992 B1 | 6/2003 | Kuster | |
| 7,293,430 B2 | 11/2007 | Fujimoto | |
| 8,517,582 B1 | 8/2013 | Erward | |
| 8,556,482 B2 | 10/2013 | Fischer | |
| 9,358,706 B2 | 6/2016 | Mühle | |
| 2005/0146797 A1 | 7/2005 | Bonitz | |
| 2005/0162758 A1* | 7/2005 | Tanaka | G02B 6/4206 359/811 |
| 2006/0042320 A1* | 3/2006 | Wang | C03B 35/00 65/246 |
| 2006/0072208 A1 | 4/2006 | Bonitz | |
| 2006/0107697 A1 | 5/2006 | Muehle | |
| 2009/0007599 A1* | 1/2009 | Muhle | C03B 11/12 65/64 |
| 2010/0206007 A1 | 8/2010 | Goldammer | |
| 2014/0042650 A1 | 2/2014 | Muehle | |
| 2016/0145141 A1* | 5/2016 | Bennett | C03B 35/207 65/103 |

FOREIGN PATENT DOCUMENTS

| | | |
|---|---|---|
| DE | 10116139 A1 | 10/2002 |
| DE | 10216706 A1 | 11/2003 |
| DE | 102007004517 A1 | 3/2009 |
| DE | 102008012283 B3 | 4/2009 |
| DE | 102008049860 A1 | 4/2010 |
| EP | 0365552 A1 | 5/1990 |
| EP | 0365552 B1 | 3/1991 |
| EP | 1645545 A1 | 4/2006 |
| JP | S61247629 A | 11/1986 |
| JP | 62191430 A | 8/1987 |
| JP | S62191430 A | 8/1987 |
| JP | S62197325 A | 9/1987 |
| JP | 62288119 A * | 12/1987 ............ C03B 11/08 |
| JP | 06122524 A | 5/1994 |
| JP | 4482248 B2 | 6/2010 |
| JP | 2010241614 A | 10/2010 |
| WO | 1988009990 A1 | 12/1988 |
| WO | 20070095895 A1 | 8/2007 |

OTHER PUBLICATIONS

JP 62288119 machine translation, Matsui, Apparatus for forming optical element, Dec. 1987 (Year: 1987).*
JP 0570154 machine translation, Sugata et al., Molding method for press lens, Mar. 1993 (Year: 1993).*
JP 05319834 machine translation, Mitsusaka et al., Method for forming optical element and device therefor, Dec. 1993 (Year: 1993).*
JP 2000351635 machine translation, Komiyama Kichizo et al., Apparatus for Producing Formed Glass Substrate, Dec. 2000 (Year: 2000).*
PCT International Search Report and Written Opinion completed Jan. 14, 2019 and issued In connection with PCT/DE2018/000272.
PCT International Search Report and Written Opinion completed Jan. 14, 2019 and issued In connection with PCT/DE2018/000273.
Official Action dated May 9, 2018 and issued in connection with DE102017009440.3.
Official Action dated May 9, 2018 and issued in connection with DE102017009441.1.
Bosch—Automotive Handbook, 9th edition, ISBN 978-1-119-03294-6, (incorporated by reference in its entirety), p. 1040.
"Werkstoffkunde Glas", 1st Edition, VEB Deutscher Verlag für Grundstoffindustrie, Leipzig VLN 152 915/55/75, LSV 3014, press date: Jan. 9, 1974, order No. 54107, p. 130.
Glastechnik—BG 1/1—Werkstoff Glas, VEB Deutscher Verlag für Grundstoffindustrie, Leipzig 1972, pp. 59-65.
Office Action dated Feb. 10, 2021 for U.S. Appl. No. 16/650,663 (pp. 1-28).
Office Action dated Jul. 30, 2021 for U.S. Appl. No. 16/650,663 (pp. 1-24).
Chinese Office Action for Chinese App. No. 201880072174.5 dated May 16, 2022, 11 pages.
Second Chinese Office Action for Chinese App. No. 201880072146.3 dated May 16, 2022, 12 pages.
Office Action (Non-Final Rejection) dated Jun. 16, 2022 for U.S. Appl. No. 16/650,663 (pp. 1-20).
Office Action (Final Rejection) dated Jan. 19, 2023 for U.S. Appl. No. 16/650,663 (pp. 1-17).
Chinese Decision of Final Rejection for CN201880072146.3 dated Jan. 4, 2023, 10 pages.

* cited by examiner

METHOD OF PRODUCING AN OPTICAL ELEMENT FROM GLASS

CROSS-REFERENCE TO RELATED APPLICATIONS

This application is a U.S. national counterpart application of international application serial No. PCT/DE2018/000272, filed Sep. 22, 2018 which claims priority to German Patent Application No. 102017009440.3, filed on Oct. 10, 2017.

BACKGROUND

The present disclosure relates to a method for producing an optical element from glass, wherein a portion of glass or a pre-form of glass is press-molded, for example on both sides, to form the optical element.

SUMMARY

The present disclosure concerns a method for producing an optical element from glass, wherein a portion of glass or a blank/pre-form of glass is press-molded, for example on both sides, to form the optical element, wherein the optical element is subsequently deposited on a transport element and, with/on the transport element, passes through a cooling path without an optical surface of the optical element being touched.

DETAILED DESCRIPTION

Figure 1:
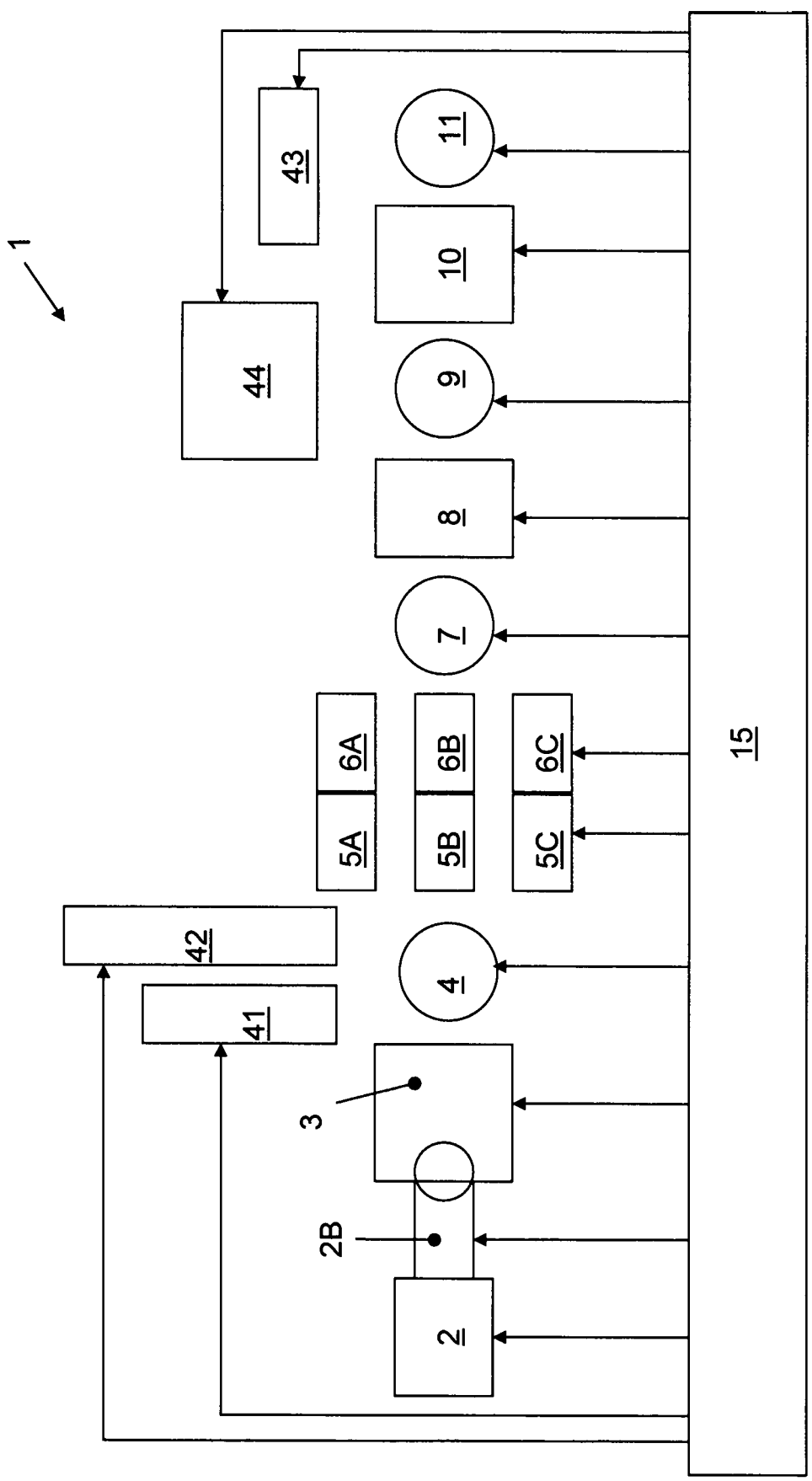
FIG. 1 shows, in a schematic diagram, a device for producing a motor vehicle headlight lens or a lens-like free-form for a motor vehicle headlight.

The disclosure concerns a method for producing an optical element from glass, wherein a portion of glass or a blank/pre-form of glass is press-molded, for example on both sides, to form the optical element, wherein the optical element is subsequently deposited on a transport element and, with/on the transport element, passes through a cooling path without an optical surface of the optical element being touched.

A blank within the meaning of the disclosure for example a portioned glass part or a pre-form or a gob. Such a gob or blank can have, for example, a round or oval or polygonal or free-form (free-formed) rectangular or square underside base surface.

An optical element within the meaning of the disclosure is, for example a lens, for example a headlight lens or a lens-like free-form. An optical element within the meaning of the disclosure is for example a lens or a lens-like free-form having a supporting edge which is, for example, circumferential, non-continuous, or non-continuously circumferential. An optical element within the meaning of the disclosure can be, for example, an optical element as is described, for example, in WO 2017/059945 A1, WO 2014/114309 A1, WO 2014/114308 A1, WO 2014/114307 A1, WO 2014/072003 A1, WO 2013/178311 A1, WO 2013/170923 A1, WO 2013/159847 A1, WO 2013/123954 A1, WO 2013/135259 A1, WO 2013/068063 A1, WO 2013/068053 A1, WO 2012/130352 A1, WO 2012/072187 A2, WO 2012/072188 A1, WO 2012/072189 A2, WO 2012/072190 A2, WO 2012/072191 A2, WO 2012/072192 A1, WO 2012/072193 A2, PCT/EP2017/000444. Each of these specifications is incorporated by reference herein in its entirety.

A cooling path within the meaning of the disclosure serves for example for the controlled cooling of the optical element (for example with the addition of heat). Examples of cooling regimes can be found, for example, in "Werkstoffkunde Glas", 1st Edition, VEB Deutscher Verlag für Grundstoffindustrie, Leipzig VLN 152-915/55/75, LSV 3014, press date: 1.9.1974, order number: 54107, e.g. page 130, and Glastechnik—BG 1/1—Werkstoff Glas", VEB Deutscher Verlag für Grundstoffindustrie, Leipzig 1972, e.g. page 61ff (incorporated by reference herein in its entirety).

In an illustrative embodiment, the transport element is made of steel. For clarification: the transport element is not part of the lens (or headlight lens), or the lens (or headlight lens) and the transport element are not part of a common one-piece body.

In a further illustrative embodiment, the transport element is heated, for example inductively, before it receives the optical element. In a further illustrative embodiment, the transport element is heated with a heating rate of at least 20 K/s, for example of at least 30 K/s. In a further illustrative embodiment, the transport element is heated with a heating rate of not more than 50 K/s. In a further illustrative embodiment, the transport element is heated by means of a current-carrying winding/coil winding or by means of current-carrying windings/coil windings, which is arranged above the transport element.

In a further illustrative embodiment, the optical element comprises a support surface which lies outside the intended light path for the optical element, wherein the support surface, for example only the support surface, is in contact with a support surface (corresponding to the support surface of the optical element) of the transport element when the optical element has been deposited on the transport element. In a further illustrative embodiment, the support surface of the optical element is located at the edge of the optical element. In a further illustrative embodiment, the transport element has at least one limiting surface for orienting the optical element on the transport element or for limiting or preventing a movement of the optical element on the transport element. In one embodiment, the limiting surface or one of the limiting surfaces is provided above the support surface (corresponding to the support surface of the optical element) of the transport element. In a further embodiment, (at least) two limiting surfaces are provided, wherein it can be provided that one limiting surface is located beneath the support surface (corresponding to the support surface of the optical element) of the transport element and one limiting surface is provided above the support surface (corresponding to the support surface of the optical element) of the transport element. In a further illustrative embodiment, the transport element is produced, for example milled, to be adapted to the optical element, or to the support surface of the optical element.

The transport element, or the support surface of the transport element, is for example annular but for example not circular.

In a further illustrative embodiment, the pre-form is produced, cast and/or molded from molten glass. In a further illustrative embodiment, the mass of the pre-form is from 20 g to 400 g.

In a further illustrative embodiment, the temperature gradient of the pre-form is so adjusted that the temperature of the core of the pre-form is above 10 K+$T_G$.

In a further illustrative embodiment, the pre-form, in order to reverse its temperature gradient, is first cooled, for example with the addition of heat, and then heated, wherein it is a for example provided that the pre-form is so heated that the temperature of the surface of the pre-form after heating is at least 100 K, for example at least 150 K, higher than the transition temperature $T_G$ of the glass. The transition temperature $T_G$ of the glass is the temperature at which the glass becomes hard. Within the meaning of the disclosure, the transition temperature $T_G$ of the glass is for example to be the temperature of the glass at which the glass has a viscosity log in a range of about 13.2 (which corresponds to $10^{13.2}$ Pas), for example between 13 (which corresponds to $10^{13}$ Pas) and 14.5 (which corresponds to $10^{14.5}$ Pas). In relation to glass type B270, the transition temperature $T_G$ is approximately 530° C.

In a further illustrative embodiment, the temperature gradient of the pre-form is so adjusted that the temperature of the core of the pre-form is at least 50 K below the temperature of the surface of the pre-form. In a further illustrative embodiment, the pre-form is so cooled that the temperature of the pre-form before heating is TG-80K to TG+30K. In a further illustrative embodiment, the temperature gradient of the pre-form is so adjusted that the temperature of the core of the pre-form is from 450° C. to 550° C. The temperature gradient is for example so adjusted that the temperature in the core of the pre-form is below $T_G$ or close to $T_G$. In a further illustrative embodiment, the temperature gradient of the pre-form is so adjusted that the temperature of the surface of the pre-form is from 700° C. to 900° C., for example from 750° C. to 850° C. In a further illustrative embodiment, the pre-form is so heated that its surface (for example immediately before pressing) assumes a temperature which corresponds to the temperature at which the glass of the pre-form has a viscosity log between 5 (which corresponds to $10^5$ Pas) and 8 (which corresponds to $10^8$ Pas), for example a viscosity log between 5.5 (which corresponds to $10^{5.5}$ Pas) and 7 (which corresponds to $10^7$ Pas).

In a further illustrative embodiment, in order to reverse the temperature gradient of the pre-form, the pre-form, located on a cooled lance carrier body through which a coolant flows, is moved (for example substantially continuously) through or into a tempering device (for cooling and/or heating the pre-form). A cooled lance for heating gobs which are pressed to form lenses having a circular base surface is disclosed in DE 101 00 515 A1.

A for example suitable lance has a tube outside diameter of from 1.0 to 4.0 mm, for example from 2.0 to 3.0 mm, and/or a tube inside diameter of from 0.5 to 1.0 mm. In addition, there is for example provided a geometry of the support surface which corresponds to the geometry of the blank which is to be heated, wherein the geometry is so chosen that the blank rests on the outer region of its underside (underside base surface). The diameter of the underside, or of the underside base surface, of the pre-form is at least 1 mm larger than the diameter of the base surface spanned by the carrier body, which base surface can be, for example, oval, square, rectangular, polygonal.

In a further illustrative embodiment, coolant flows through the lance by the counter-flow principle. In a further illustrative embodiment, the coolant is additionally, or actively, heated.

It is provided for example that the pre-form is removed from a mold for shaping or producing the pre-form before the temperature gradient is reversed. It is provided for example that the reversal of the temperature gradient takes place outside a mold. Within the meaning of the disclosure, cooling with the addition of heat is to mean for example that cooling is carried out at a temperature of more than 100° C.

Glass within the meaning of the disclosure is for example inorganic glass. Glass within the meaning of the disclosure is for example silicate glass. Glass within the meaning of the disclosure is for example glass as is described in WO 2009/109209 A1. Glass within the meaning of the disclosure comprises for example from 0.2 to 2 wt. % $Al_2O_3$,
from 0.1 to 1 wt. % $Li_2O$,
from 0.3, for example 0.4, to 1.5 wt. % $Sb_2O_3$,
from 60 to 75 wt. % $SiO_2$,
from 3 to 12 wt. % $Na_2O$,
from 3 to 12 wt. % $K_2O$, and
from 3 to 12 wt. % CaO,
such as, for example, DOCTAN®.

Within the meaning of the disclosure, press-molding is to be understood for example as meaning the pressing of a (for example optically active) surface in such a manner that subsequent post-processing of the contour of that (for example optically active) surface can be omitted or is omitted or is not provided. It is thus provided for example that a press-molded surface is not ground after press-molding. Polishing, which, however, does not influence the surface condition of the contour of the surface, can be provided in some circumstances. Press-molding on both sides is for example to be understood as meaning that a (for example optically active) light outlet surface is press-molded and a (for example optically active) light inlet surface for example located opposite the (for example optically active) light outlet surface is likewise press-molded.

Motor vehicle within the meaning of the disclosure is for example a land vehicle which can be used individually in road traffic. Motor vehicles within the meaning of the disclosure are for example not limited to land vehicles with an internal combustion engine.

Figure 2:
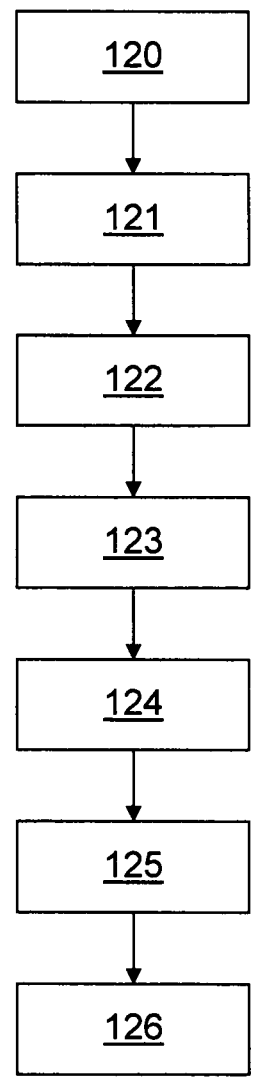
FIG. 2 shows an example of a sequence of a method for producing a motor vehicle headlight lens or a lens like free-form for a motor vehicle headlight.
Figure 12:
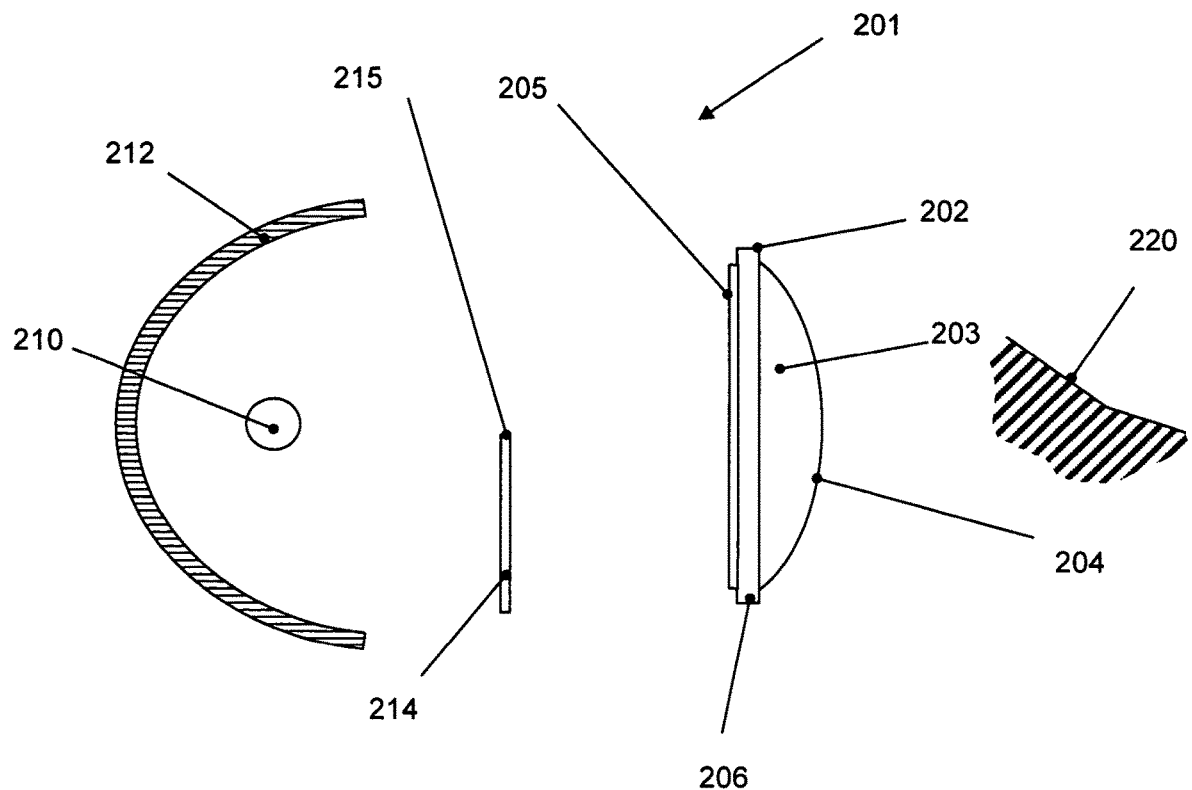
FIG. 12 shows a schematic diagram of a typical motor vehicle headlight (projector headlight) with a headlight lens.

FIG. 1 shows—in a schematic diagram—a device 1 for carrying out a method shown in FIG. 2 for producing optical elements, such as, for example, optical lenses, such as, for example, motor vehicle headlight lenses, for example such as the (motor vehicle) headlight lens 202 shown in FIG. 12, or of lens-like free-forms, for example for motor vehicle headlights.

FIG. 12 shows a schematic diagram of a motor vehicle headlight 201 (projector headlight) having a light source 210 for generating light, a reflector 212 for reflecting light which can be generated by means of the light source 210, and a shield 214. The motor vehicle headlight 201 additionally comprises a headlight lens 202 for depicting an edge 215 of the shield 214 as a light/dark boundary 220 by means of light which can be generated by means of the light source 210. Typical requirements of the light/dark boundary or of the light distribution in consideration of or including the light/dark boundary are disclosed, for example, in Bosch—Automotive Handbook, 9th edition, ISBN 978-1-119-03294-6, page 1040. A headlight lens within the meaning of the disclosure is, for example, a headlight lens by means of which a light/dark boundary can be generated, and/or a headlight lens by means of which the requirements according to Bosch—Automotive Handbook, 9th edition, ISBN 978-1-119-03294-6 (incorporated by reference in its entirety), page 1040, can be met. The headlight lens 202 comprises a lens body 203 of glass, which comprises a substantially planar (for example optically active) surface 205 facing towards the light source 210 and a substantially convex (for example optically active) surface 204 facing away from the light source 210. The headlight lens 202 additionally comprises a (for example circumferential) edge 206 by means of which the headlight lens 202 can be capable of being fastened in the motor vehicle headlight 201. The elements in FIG. 12 have been drawn having regard to simplicity and clarity and not necessarily true to scale. Thus, for example, the orders of magnitude of some elements are shown exaggeratedly compared to other elements in order to improve the understanding of the exemplary embodiment of the present invention.

Figure 13:
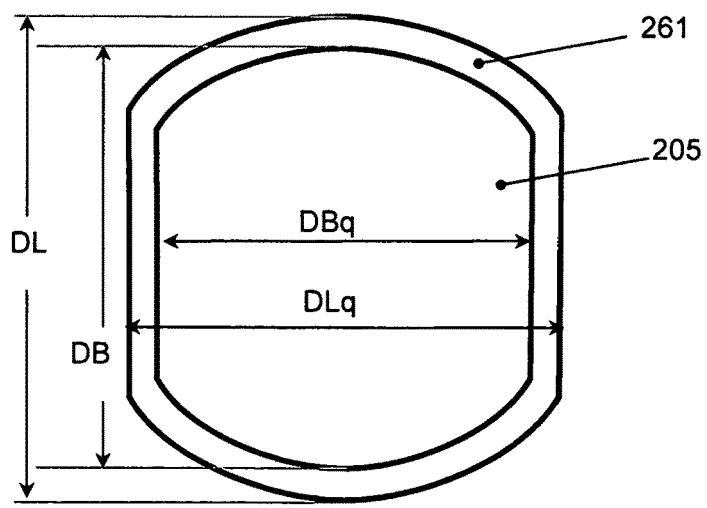
FIG. 13 shows a headlight lens according to FIG. 12 in a view from beneath.
Figure 14:
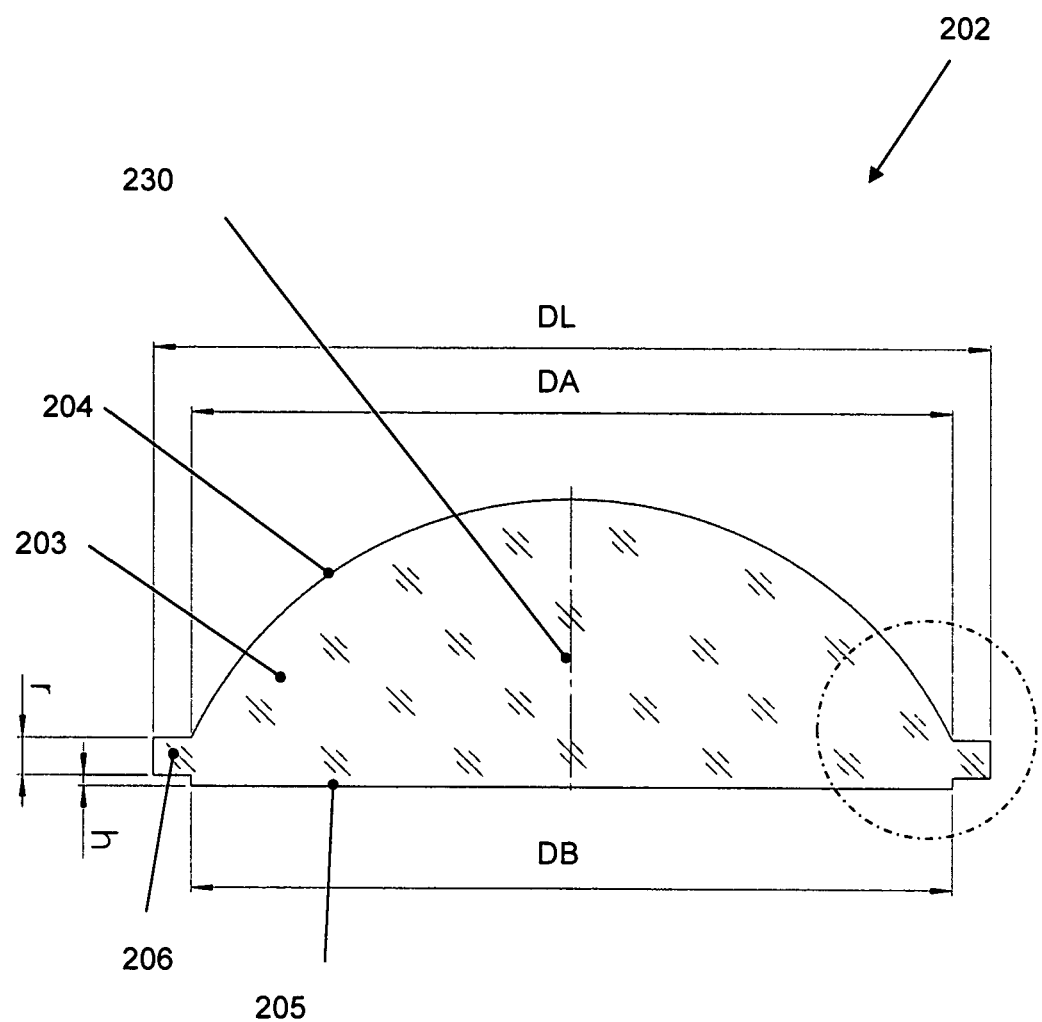
FIG. 14 is a cross-sectional representation of the lens according to FIG. 13.
Figure 15:
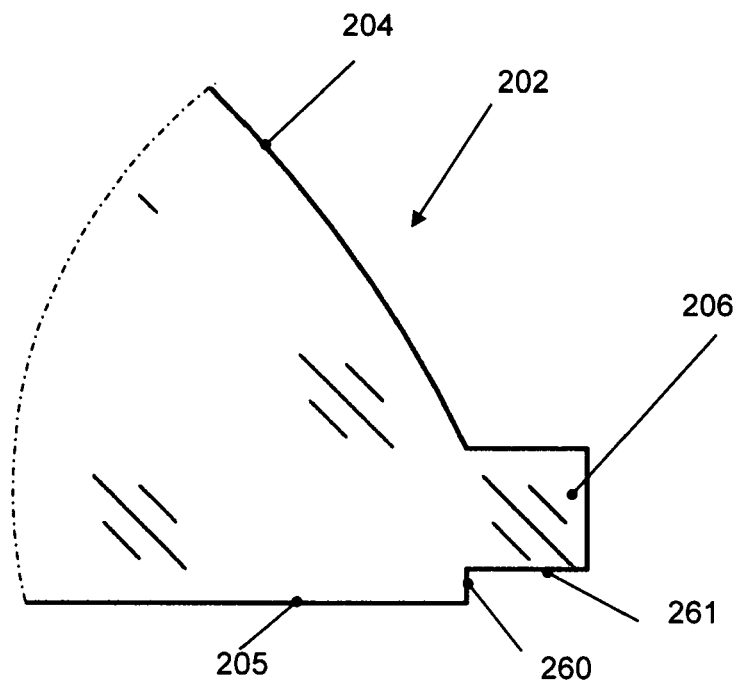
FIG. 15 shows a detail from the representation according to FIG. 14.

FIG. 13 shows the headlight lens 202 from beneath. FIG. 14 shows a cross-section through an exemplary embodiment of the headlight lens. FIG. 15 shows a detail of the headlight lens 202 marked in FIG. 14 by a dot-and-dash circle. The planar (for example optically active) surface 205 projects beyond the lens edge 206, or beyond the surface 261 of the lens edge 206 facing towards the light source 210, in the form of a step 260 in the direction towards the optical axis 230 of the headlight lens 202, wherein the height h of the step 260 is, for example, not more than 1 mm, for example not more than 0.5 mm. The nominal value of the height h of the step 260 is for example 0.2 mm.

The thickness r of the lens edge 206 is at least 2 mm but not more than 5 mm. The diameter DL of the headlight lens 202 is at least 40 mm but not more than 100 mm. The diameter DB of the substantially planar (for example optically active) surface 205 is equal to the diameter DA of the convexly curved optically active surface 204. In an illustrative embodiment, the diameter DB of the substantially planar optically active surface 205 is not more than 110% of the diameter DA of the convexly curved optically active surface 204. In addition, the diameter DB of the substantially planar optically active surface 205 is for example at least 90% of the diameter DA of the convexly curved optically active surface 204. The diameter DL of the headlight lens 202 is for example approximately 5 mm larger than the diameter DB of the substantially planar optically active surface 205, or than the diameter DA of the convexly curved optically active surface 204. The diameter DLq of the headlight lens 202 is at least 40 mm but not more than 80 mm and is smaller than the diameter DL. The diameter DLq of the headlight lens 202 is for example approximately 5 mm larger than the diameter DBq.

In a further illustrative embodiment, the (optically active) surface 204 that is to face away from the light source and/or the (optically active) surface 205 that is to face towards the light source has a light-scattering surface structure (generated by molding/pressed). A suitable light-scattering surface structure comprises, for example, a modulation and/or a (surface) roughness of at least 0.05 μm, for example at least 0.08μ, or is configured as a modulation optionally with an additional (surface) roughness of at least 0.05 μm, for example at least 0.08μ. Roughness within the meaning of the disclosure is to be defined for example as Ra, for example according to ISO 4287. In a further illustrative embodiment, the light-scattering surface structure can comprise a structure modelled on the surface of a golf ball or be configured as a structure modelled on the surface of a golf ball. Suitable light-scattering surface structures are disclosed, for example, in DE 10 2005 009 556, DE 102 26 471 B4 and DE 29 14 114 U1. Further forms of light-scattering surface structures are disclosed in German patent specification 1 099 964, DE 36 02 262 C2, DE 40 31 352 A1, U.S. Pat. No. 6,130,777, US 2001/0033726 A1, JP 10123307 A, JP 09159810 A and JP 01147403 A.

The device 1 for producing optical elements such as the headlight lens 202 comprises a melting unit 2, such as a trough, in which glass, in the present exemplary embodiment DOCTAN®, is melted in a process step 120.

The melting unit 2 can comprise, for example, an adjustable outlet. From the melt unit 2, liquid glass is introduced in a process step 121 into a pre-forming device 3 for producing a pre-form, for example having a mass of from 50 g to 250 g, such as, for example, a gob or a near-net-shape pre-form (a near-net-shape pre-form has a shape which is similar to the shape of the motor vehicle headlight lens or lens-like free-form for a motor vehicle headlight that is to be pressed). The pre-forming device can comprise, for example, molds, into which a defined amount of glass is poured. By means of the pre-forming device 3, the pre-form is produced in a process step 122.

Process step 122 is followed by a process step 123, in which the pre-form is transferred by means of a transfer station 4 to one of the cooling devices 5A, 5B or 5C and, by means of the cooling device 5A, 5B or 5C, is cooled at a temperature between 300° C. and 500° C., for example between 350° C. and 450° C. In the present exemplary embodiment, the pre-form is cooled for more than 10 minutes at a temperature of 400° C., so that its temperature on the inside is approximately 500° C.

In a subsequent process step 124, the pre-form is heated by means of one of the heating devices 6A, 6B or 6C at a temperature between 1000° C. and 1250° C., wherein it is for example provided that the pre-form is so heated that the temperature of the surface of the pre-form after heating is at least 100° C., for example at least 150° C., higher than $T_G$ and for example is from 750° C. to 850° C. A combination of the cooling device 5A with the heating device 6A, a combination of the cooling device 5B with the heating device 6B or a combination of the cooling device 5C with the heating device 6C is an example of a tempering device for adjusting the temperature gradient.

Figure 5:
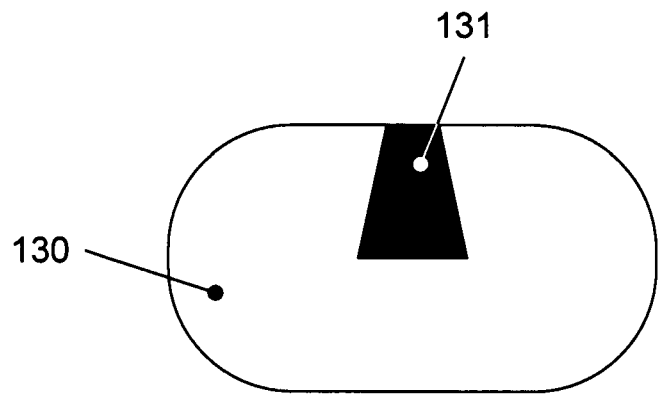
FIG. 5 shows an example of a pre-form before it enters a tempering device.
Figure 6:
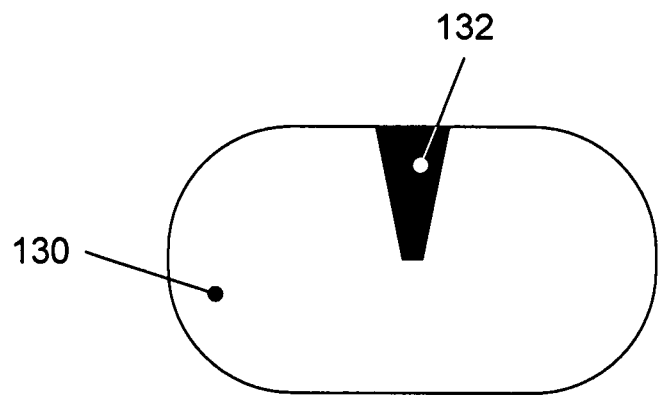
FIG. 6 shows an example of a pre-form having a reversed temperature gradient after it has left a tempering device.

Process steps 123 and 124 are so matched to one another—as will be explained hereinbelow with reference to FIG. 5 and FIG. 6—that a reversal of the temperature gradient is achieved. FIG. 5 shows an example of a pre-form 130 before it enters one of the cooling devices 5A, 5B or 5C, and FIG. 6 shows the pre-form 130 with a reversed temperature gradient after it has left one of the heating devices 6A, 6B or 6C. While the blank is warmer on the inside than on the outside before process step 123 (with a continuous temperature profile), it is warmer on the outside than on the inside after process step 124 (with a continuous temperature profile). The wedges denoted with reference numerals 131 and 132 symbolize the temperature gradients, wherein the width of a wedge 131 or 132 symbolizes a temperature.

Figure 3:
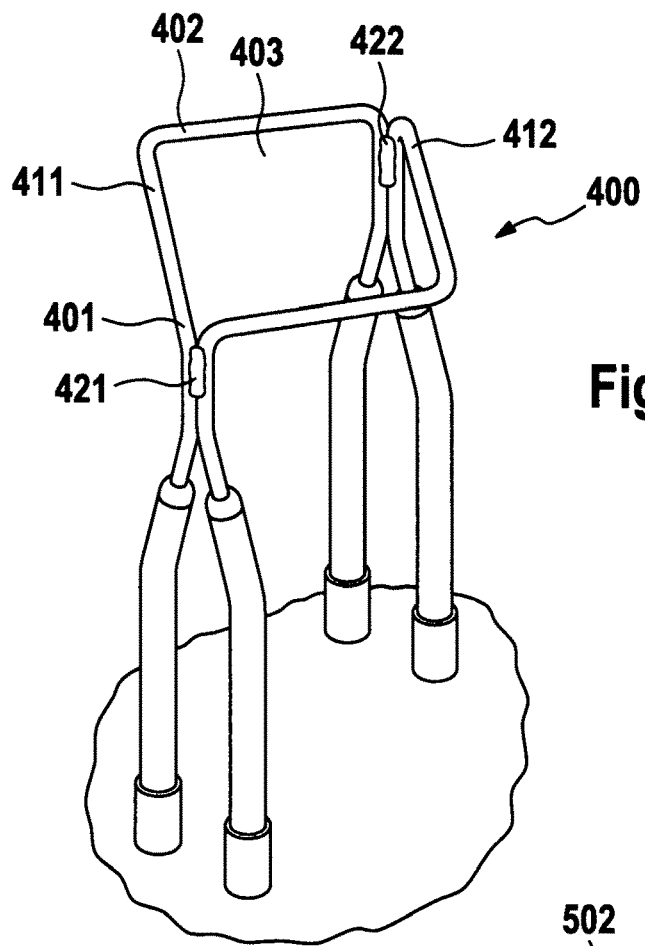
FIG. 3 shows an exemplary embodiment of a lance.

For reversing its temperature gradient, a pre-form, located on a cooled lance, not shown, is in an illustrative embodiment moved (for example substantially continuously) through a tempering device comprising one of the cooling devices 5A, 5B or 5C and one of the heating devices 6A, 6B or 6C or maintained in one of the cooling devices 5A, 5B or 5C and/or one of the heating devices 6A, 6B or 6C. A cooled lance is disclosed in DE 101 00 515 A1 and in DE 101 16 139 A1. Depending on the shape of the pre-form, FIG. 3 and FIG. 4 for example show suitable lances. Coolant for example flows through the lance by the counter-flow principle. Alternatively or in addition, it can be provided that the coolant is additionally, or actively, heated.

For the term "lance", the term "support device" is also used hereinbelow. The support device 400 shown in FIG. 3 comprises a carrier body 401 having a hollow cross-section and an annular support surface 402. The carrier body 401 is in tubular form at least in the region of the support surface 402 and is uncoated at least in the region of the support surface 402. The diameter of the hollow cross-section of the carrier body 401 at least in the region of the support surface 402 is not smaller than 0.5 mm and/or not larger than 1 mm. The outside diameter of the carrier body 401 at least in the region of the support surface is not smaller than 2 mm and/or not larger than 3 mm. The support surface 402 spans a square base surface 403 with rounded corners. The carrier body 401 comprises two flow channels 411 and 412 for the cooling medium which flows through, each of which flow channels extends over only a portion of the annular support surface 402, wherein the flow channels 411 and 412 are connected by means of metal filling material 421 and 422, for example solder, in a region in which they leave the support surface 402.

Figure 4:
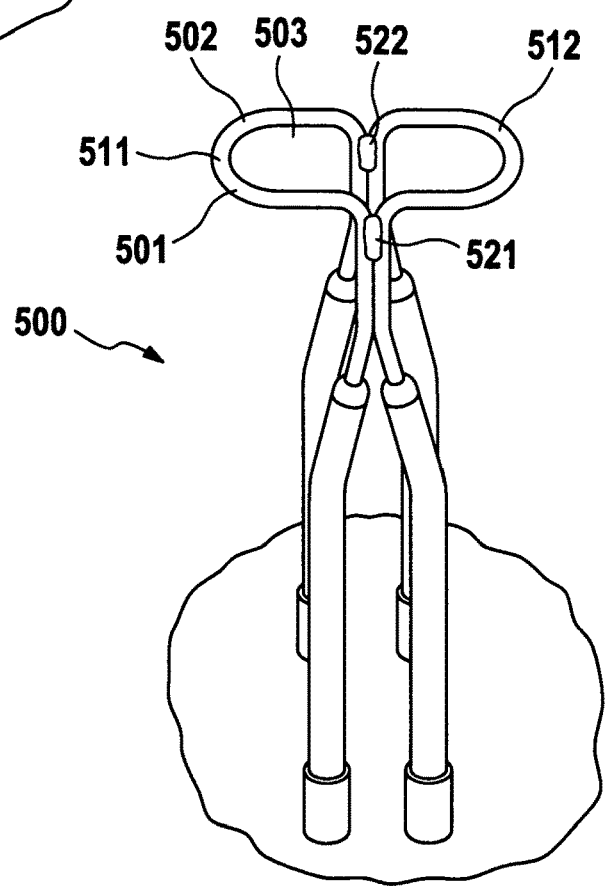
FIG. 4 shows a further exemplary embodiment of a lance.

The support device 500 shown in FIG. 4 comprises a carrier body 501 having a hollow cross-section and an annular support surface 502. The carrier body 501 is in tubular form at least in the region of the support surface 502 and is uncoated at least in the region of the support surface 502. The diameter of the hollow cross-section of the carrier body 501 at least in the region of the support surface 502 is not smaller than 0.5 mm and/or not larger than 1 mm. The outside diameter of the carrier body 501 at least in the region of the support surface is not smaller than 2 mm and/or not larger than 3 mm. The support surface 502 spans an oval base surface 503. The carrier body 501 comprises two flow channels 511 and 512 for the cooling medium which flows through, each of which flow channels extends over only a portion of the annular support surface 502, wherein the flow channels 511 and 512 are connected by means of metal filling material 521 and 522, for example solder, in a region in which they leave the support surface 502.

It can be provided that pre-forms are removed after passing through the cooling device 5*a*, 5*b* or 5*c* and transported by means of a transport device 41, for example to an intermediate storage means (e.g. in which they are stored at room temperature). In addition, it can be provided that pre-forms are fed by means of a transport device 42 to the transfer station 4 and are included in the further process (for example starting from room temperature) by heating in the heating devices 6*a*, 6*b* or 6*c*.

Figure 7:
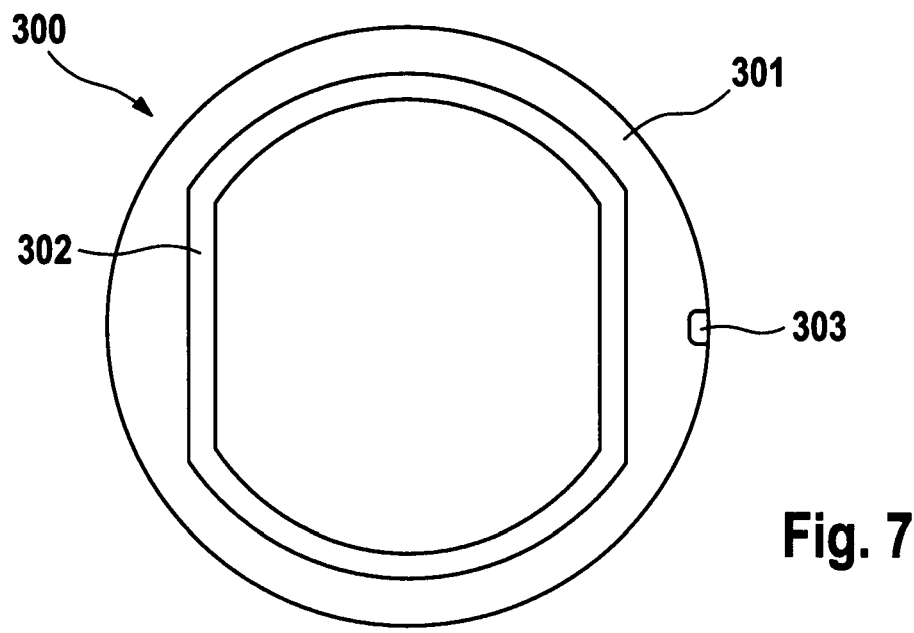
FIG. 7 shows an exemplary embodiment of a transport element.
Figure 16:
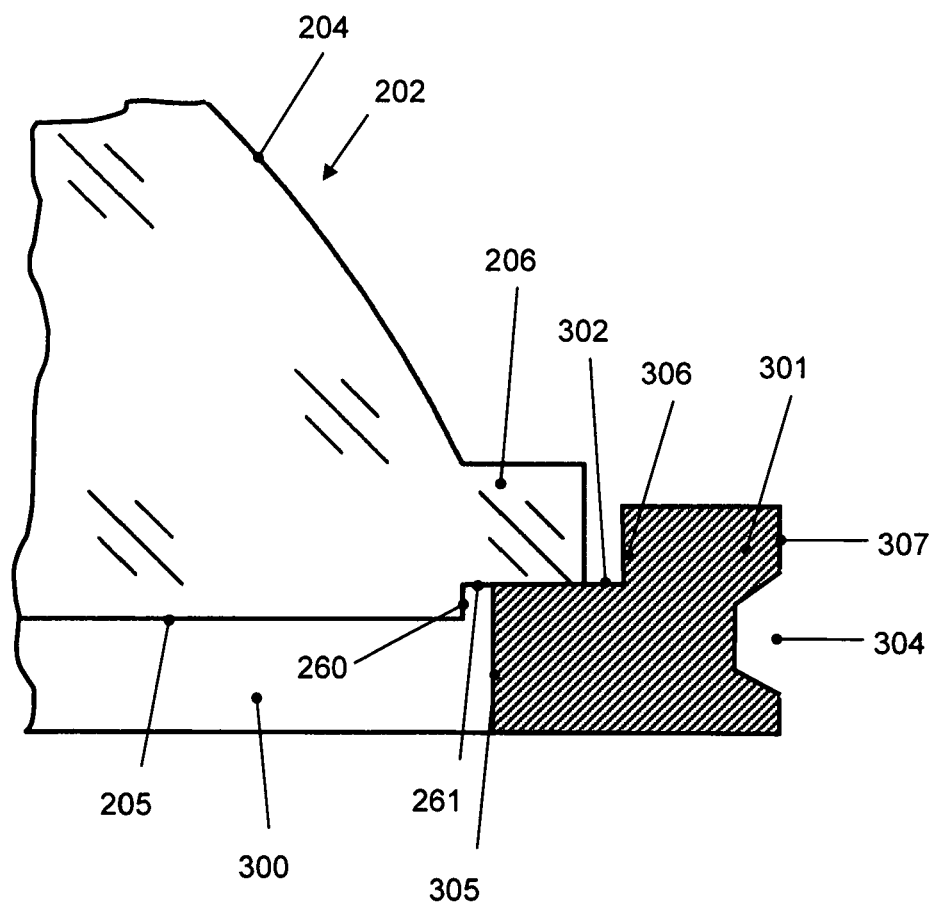
FIG. 16 shows the detail according to FIG. 15 with a partial representation of the transport element (in a cross-sectional representation).

Downstream of the heating devices 6A, 6B, 6C there is provided a press or pressing station 8, to which a pre-form is transferred by means of a transfer station 7. By means of the press or pressing station 8, the pre-form is press-molded, for example on both sides, in a process step 125 to form the headlight lens 202. A suitable mold set is disclosed, for example, in EP 2 104 651 B1. Thereafter, the headlight lens 202 is deposited by means of a transfer station 9 on a transport element 300 shown in FIG. 7 and is transferred on the transport element 300 to a cooling path 10. The annular transport element 300 shown in FIG. 7 is made of steel, for example of ferritic or martensitic steel. The annular transport element 300 has on its inner side a (corresponding) support surface 302, on which the optical element to be cooled, such as the headlight lens 202, is placed by its edge, so that damage to the optical surfaces, such as the surface 205, is avoided. The (corresponding) support surface 302 and the support surface 261 of the lens edge 206, for example, thus come into contact, as is shown, for example, in FIG. 16. FIG. 16 shows the fixing, or aligning, of the headlight lens 202 on the transport element 300 by means of a limiting surface 305 or a limiting surface 306. The limiting surfaces 305 and 306 are for example orthogonal to the (corresponding) support surface 302. It is thereby provided that the limiting surfaces 305, 306 have sufficient play relative to the headlight lens 202, so that headlight lens 202 can be deposited on the transport element 300, for example can be deposited for example without the headlight lens 202 tilting or becoming jammed on the transport element 300.

Figure 8:
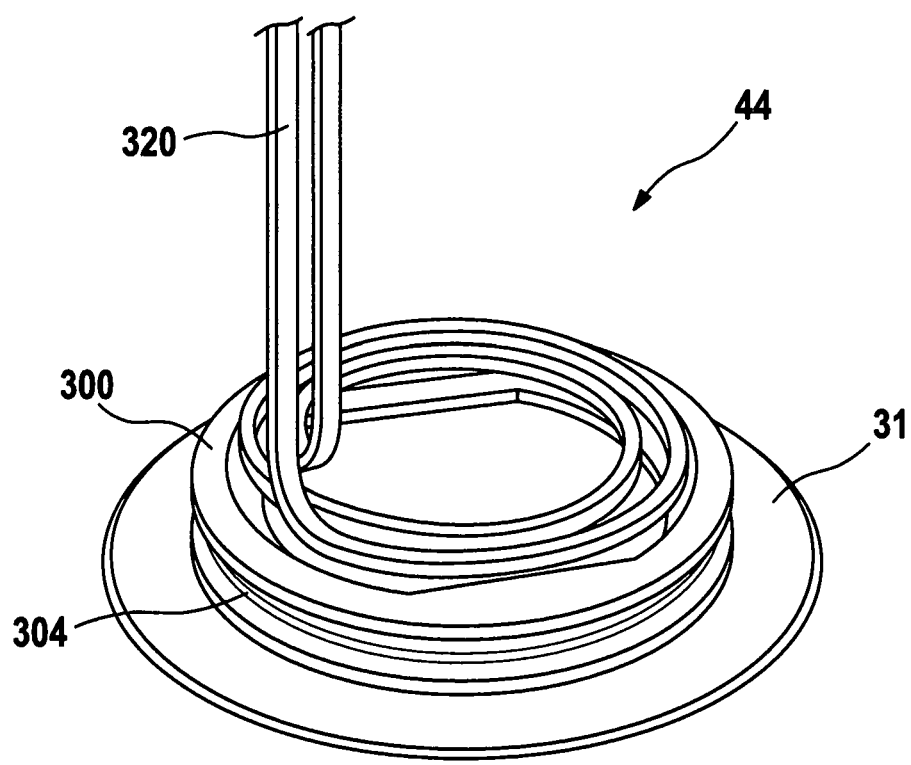
FIG. 8 shows an exemplary embodiment of a heating device for a transport element according to FIG. 7.
Figure 9:
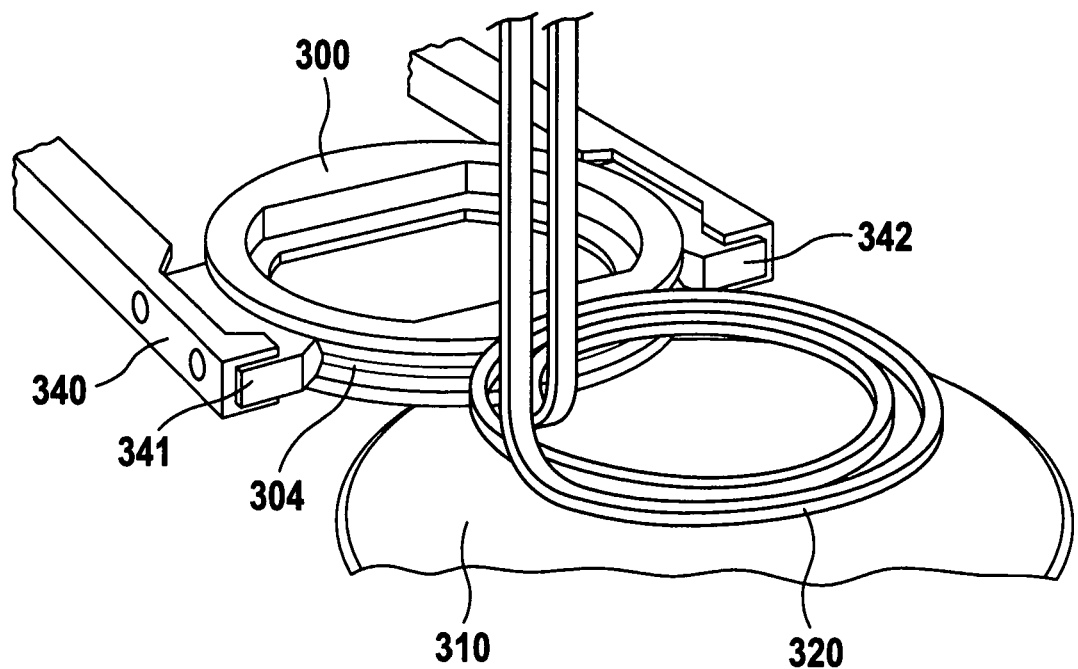
FIG. 9 shows an exemplary embodiment for the removal of a transport element according to FIG. 7 from a heating station according to FIG. 8.
Figure 10:
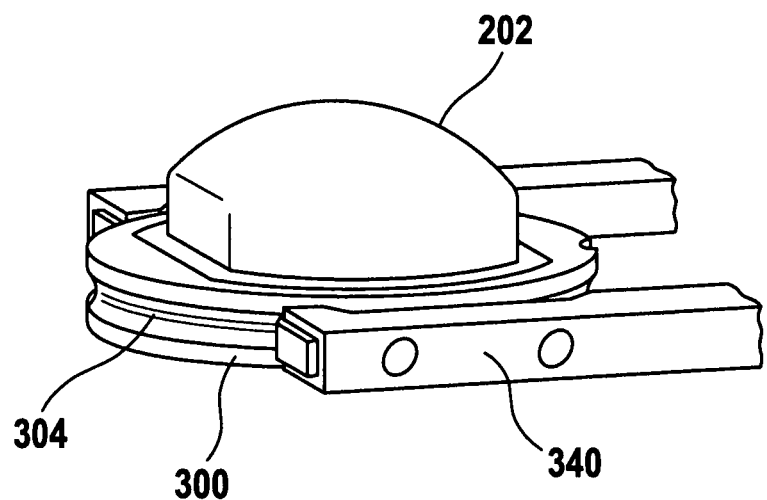
FIG. 10 shows a headlight lens on a transport element according to FIG. 7.

In addition, before the headlight lens 202 is deposited on the transport element 300, the transport element 300 is heated so that the temperature of the transport element 300 has approximately the temperature+/−50 K of the headlight lens 202, or of the edge 206. Heating for example takes place by means of an induction coil 320, as is shown in FIG. 8. The transport element 300 is thereby deposited on a support 310 and heated by means of the induction coil/induction heater 320 for example at a heating rate of 30-50 K/s, for example within less than 10 seconds. The transport element 300 is then gripped by a gripper 340, as shown in FIG. 9. The transport element 300 for example has at its outer edge a neck 304, which in an illustrative embodiment is configured to be circumferential. For correct orientation/alignment, the transport element 300 has a marking groove 303. By means of the gripper 340, the transport element 300 is guided to the pressing station, and the headlight lens 202 is transferred from the pressing station to the transport element, as shown in FIG. 10.

In an example embodiment, it is provided that the support 310 is in the form of a rotatable plate. The transport element 300 is thus placed by means of hydraulic and automated movement units (e.g. by means of the gripper 340) on the support 310 in the form of a rotatable plate. Centering is then carried out by means of two centering jaws 341 and 342 of the gripper 340, namely in such a manner that the transport elements acquires the orientation/alignment defined by the marking groove 303, which is detected or can be detected by means of a position sensor. As soon as the transport element 300 has reached its linear end position, the support 310 in the form of the rotary plate begins to rotate until a position sensor has detected the marking groove 303. The transport element 300 with the headlight lens 202 is then placed on the cooling path 10. By means of the cooling path 10, the headlight lens 202 is cooled in a process step 126.

Figure 11:
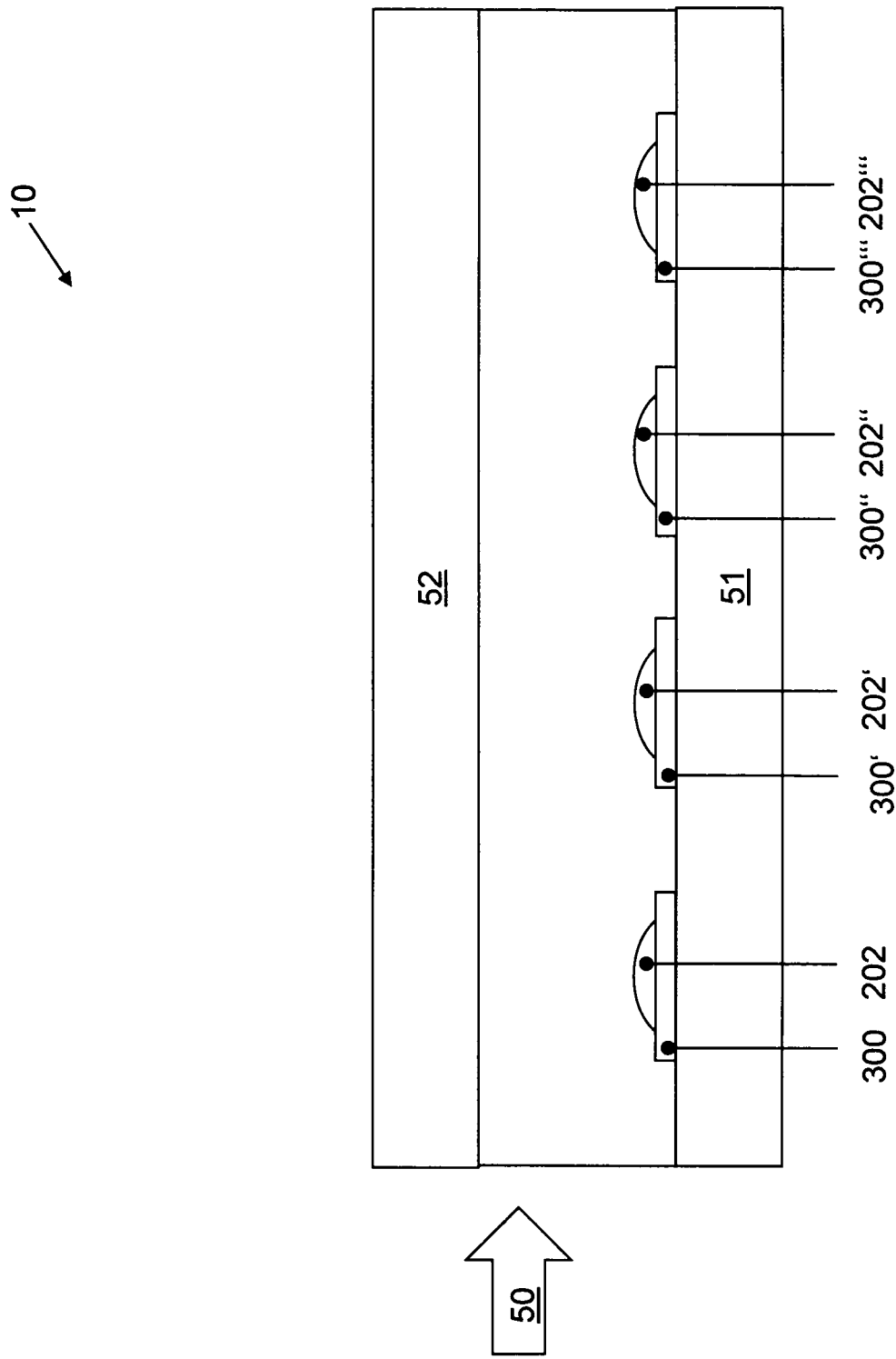
FIG. 11 shows, in a schematic diagram, an exemplary embodiment of a cooling path.

FIG. 11 shows the exemplary cooling path 10 from FIG. 1 in a more detailed schematic diagram. The cooling path 10 comprises a tunnel which is heated by means of a heating device 52 and through which the headlight lenses 202, 202', 202", 202'" are slowly moved on transport elements 300, 300', 300", 300'" in a movement direction marked by an arrow 50. The heating power thereby decreases in the movement direction of the transport elements 300, 300', 300", 300'" with the headlight lenses 202, 202', 202", 202'". For moving the transport elements 300, 300', 300", 300'" with the headlight lenses 202, 202', 202", 202'" there is provided, for example, a conveyor belt 51, for example of chain members or implemented as a row of rollers.

At the end of the cooling path 10 there is provided a removal station 11, which removes the transport element 300 together with the headlight lens 202 from the cooling path 10. In addition, the removal station 11 separates the transport element 300 and the headlight lens 202 and transfers the transport element 300 to a return transport device 43. From the return transport device 43, the transport element 300 is transferred by means of the transfer station 9 to the heating station 44, in which the transport element 300 is deposited on the support 310 in the form of a rotary plate and heated by means of the induction heater 320.

The device 11 shown in FIG. 1 additionally comprises a control arrangement 15 for controlling or regulating the device 1 shown in FIG. 1. The control arrangement 15 thereby for example ensures that the individual process steps are continuously connected.

The elements in FIG. 1, FIG. 2, FIG. 5, FIG. 6, FIG. 11 and FIG. 16 have been drawn having regard to simplicity and clarity and not necessarily true to scale. Thus, for example, the orders of magnitude of some elements are shown exaggeratedly compared to other elements in order to improve the understanding of the exemplary embodiments of the present invention. The method according to the invention is for example suitable for the production of optical elements such as, for example, lenses having a non-circular base surface.

The disclosure provides for an improved production method for optical elements. In addition, the costs of a production method may be reduced.

EP 2 104 651 B1 discloses a method for producing headlight lenses for vehicle headlights, wherein a headlight lens comprises a lens body of glass with a substantially planar surface and a convexly curved surface, wherein a pre-form is press-molded between a first mold for pressing the convexly curved surface and a second mold for pressing the substantially planar surface, which second mold comprises a first mold section and an annular second mold section enclosing the first mold section, to form a headlight lens having an integrally molded lens edge, wherein, by means of an offset between the second mold section and the first mold section that is dependent on the volume of the pre-form, a step is pressed into the headlight lens, and wherein the first mold section is set back with respect to the second mold section at least in the region of the offset.

WO 2007/095895 A1 describes a method for press-molding a motor vehicle headlight lens or a lens-like free-form for a motor vehicle headlight, wherein a pre-form of glass is produced, wherein the temperature gradient of the pre-form is reversed, and wherein the motor vehicle headlight lens or the lens-like free-form for a motor vehicle headlight is subsequently pressed from the pre-form.

DE 112008003157 B4 discloses the controlled cooling of injection-pressed headlight lenses with a sprue in a cooling path with the addition of heat, wherein the cooling path has rollers on which the headlight lenses are moved slowly through the cooling path. After cooling, the sprue is removed.

The invention claimed is:

1. A method for producing vehicle headlight lens from glass, the method comprising:
providing a heating station;
providing a cooling path separate from the heating station;
providing a support device;
providing a blank of glass;
heating the blank deposited on the support device;
providing a transport element with a support surface;
heating the transport element in the heating station;
press-molding the blank of glass to form a vehicle headlight lens having a light inlet surface within an intended light path for the vehicle headlight lens, a light outlet surface within the intended light path for the vehicle headlight lens, and a support surface outside the intended light path for the vehicle headlight lens;
subsequently depositing the vehicle headlight lens on the heated transport element such that the support surface of the transport element being in contact with a support surface of the vehicle headlight lens;
passing the transport element together with the vehicle headlight lens through the cooling path, without the light inlet surface of the vehicle headlight lens being touched and without the light outlet surface of the vehicle headlight lens being touched;
cooling the headlight lens in the cooling path with the addition of heat;
afterwards separating the transport element and the vehicle headlight lens; and
returning the transport element to the heating station.

2. The method of claim 1, wherein the transport element is made of steel.

3. The method of claim 1, the method further comprising:
inductively heating the transport element by means of an inductive heater before receiving the vehicle headlight lens.

4. The method of claim 3, wherein the transport element is heated with a heating rate of at least 20 K/s.

5. The method of claim 4, wherein the transport element is heated with a heating rate of not more than 50 K/s.

6. The method of claim 3, wherein the transport element is heated with a heating rate of not more than 50 K/s.

7. The method of claim 3, wherein the transport element is heated by means of at least one current-carrying winding.

8. The method of claim 3, wherein the transport element is heated by means of at least one current-carrying coil.

9. The method of claim 3, wherein the transport element is heated by means of at least one current-carrying winding arranged above the transport element.

10. The method of claim 1, the support surface of the vehicle headlight lens being part of a lens edge of the vehicle headlight lens.

11. The method of claim 10, wherein the transport element is heated so that when depositing the vehicle headlight lens on the transport element the temperature of the transport element has the temperature ±50K of the temperature of the lens edge.

12. The method of claim 11, the method further comprising:
aligning the vehicle headlight lens with the transport element by means of a limiting surface of the transport element.

13. The method of claim 12, the limiting surface of the transport element being orthogonal to the support surface of the transport element.

14. The method of claim 1, the method further comprising:
aligning the vehicle headlight lens with the transport element by means of a limiting surface of the transport element.

15. The method of claim 14, the limiting surface of the transport element being orthogonal to the support surface of the transport element, wherein the support surface of the transport element is annular but not circular.

16. The method of claim 1, wherein the vehicle headlight lens has a first diameter and a second diameter orthogonal to the first diameter, the first diameter of the vehicle headlight lens being smaller than the second diameter of the vehicle headlight lens.

17. A method for manufacturing a vehicle headlight lens from glass, the method comprising:
providing a heating station;
providing a cooling path comprising a tunnel;
providing a support device;
providing a blank of glass;
heating the blank deposited on the support device;
providing a transport element with a support surface;
inductively heating the transport element in the heating station;
press-molding the blank of glass to form a vehicle headlight lens having a light inlet surface within an intended light path for the vehicle headlight lens, a light outlet surface within the intended light path for the vehicle headlight lens, and a support surface outside the intended light path for the vehicle headlight lens;
subsequently depositing the vehicle headlight lens on the heated transport element such that the support surface of the transport element being in contact with a support surface of the vehicle headlight lens;
passing the transport element together with the vehicle headlight lens through the cooling path, without the light inlet surface of the vehicle headlight lens being touched and without the light outlet surface of the vehicle headlight lens being touched;
cooling the headlight lens in the cooling path with the addition of heat;
afterwards separating the transport element and the vehicle headlight lens at the end of the cooling path; and
returning the transport element to the heating station.

18. The method of claim 17, the support surface of the vehicle headlight lens being part of a lens edge of the vehicle headlight lens.

19. The method of claim 18, wherein the transport element is heated so that when depositing the vehicle headlight lens on the transport element the temperature of the transport element has the temperature ±50K of the temperature of the lens edge.

20. The method of claim 19, wherein the transport element is heated with a heating rate of at least 20 K/s.

21. The method of claim 20, wherein the transport element is heated with a heating rate of not more than 50 K/s.

22. The method of claim 17, wherein the vehicle headlight lens has a first diameter and a second diameter orthogonal to the first diameter, the first diameter of the vehicle headlight lens being smaller than the second diameter of the vehicle headlight lens.

* * * * *